United States Patent
Wescoe et al.

(10) Patent No.: US 10,063,584 B1
(45) Date of Patent: *Aug. 28, 2018

(54) ADVANCED PROCESSING OF ELECTRONIC MESSAGES WITH ATTACHMENTS IN A CYBERSECURITY SYSTEM

(71) Applicant: Wombat Security Technologies, Inc., Pittsburgh, PA (US)

(72) Inventors: Kurt Wescoe, Pittsburgh, PA (US); John T. Campbell, Bridgeville, PA (US); Joseph A. Ferrara, Wexford, PA (US); Trevor T. Hawthorn, Ashburn, VA (US); Alan Himler, Pittsburgh, PA (US); Norman Sadeh-Koniecpol, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,797

(22) Filed: Jan. 24, 2018

Related U.S. Application Data

(63) Continuation of application No. 15/239,688, filed on Aug. 17, 2016, now Pat. No. 9,912,687.

(51) Int. Cl.
   *H04L 29/06* (2006.01)

(52) U.S. Cl.
   CPC ...... *H04L 63/1433* (2013.01); *H04L 63/1483* (2013.01); *H04L 67/42* (2013.01)

(58) Field of Classification Search
   CPC ... H04L 63/126; H04L 63/1433; H04L 51/08; H04L 69/22; G06F 21/577; G06F 21/6227; G06F 21/56
   See application file for complete search history.

(56) References Cited

U.S. PATENT DOCUMENTS

| | | |
|---|---|---|
| 6,324,647 B1 | 11/2001 | Bowman-Amuah |
| 7,647,376 B1 | 1/2010 | Jagger et al. |
| 7,925,883 B2 | 4/2011 | Florencio et al. |
| 7,971,246 B1 | 6/2011 | Emigh et al. |
| 8,205,255 B2 | 6/2012 | Benea et al. |
| 8,332,947 B1 | 12/2012 | Bregman et al. |

(Continued)

OTHER PUBLICATIONS

Review of Wombat Security Technologies PhishGuru™ PCMag.com, dated May 25, 2012, available at http:/www.pcmag.com/article2/0,2817,2404750,00.asp.

(Continued)

*Primary Examiner* — Tri Tran
(74) *Attorney, Agent, or Firm* — Fox Rothschild LLP

(57) ABSTRACT

A system manages computer security risks associated with message file attachments. When a user of an electronic device with a messaging client attempts to open an attachment to a message that is in the client's inbox, the system will analyze the message to determine whether the message is a legitimate message or a potentially malicious message without the need to actually process or analyze the attachment itself. If the system determines that the received message is a legitimate message, the system will permit the attachment to actuate on the client computing device. If the system determines that the received message is not or may not be a legitimate message, the system will continue preventing the attachment from actuating on the client computing device.

22 Claims, 5 Drawing Sheets

(56) References Cited

U.S. PATENT DOCUMENTS

| | | |
|---|---|---|
| 8,468,244 B2 | 6/2013 | Redlich et al. |
| 8,484,741 B1 | 7/2013 | Chapman |
| 8,566,938 B1 | 10/2013 | Prakash et al. |
| 8,615,807 B1 | 12/2013 | Higbee et al. |
| 8,910,287 B1 | 12/2014 | Belani et al. |
| 9,027,134 B2 | 5/2015 | Foster et al. |
| 9,065,826 B2 | 6/2015 | Colvin et al. |
| 9,076,132 B2 | 7/2015 | Golan et al. |
| 9,118,702 B2 | 8/2015 | MaCaulay |
| 9,143,476 B2 | 9/2015 | Dreller et al. |
| 9,143,529 B2 | 9/2015 | Qureshi et al. |
| 9,154,514 B1 | 10/2015 | Prakash |
| 9,253,207 B2 | 2/2016 | Higbee et al. |
| 9,262,629 B2 | 2/2016 | Belani et al. |
| 9,280,911 B2 | 3/2016 | Sadeh-Koniecpol et al. |
| 9,356,948 B2 | 5/2016 | Higbee et al. |
| 9,373,267 B2 | 6/2016 | Sadeh-Koniecpol et al. |
| 9,398,038 B2 | 7/2016 | Higbee et al. |
| 9,501,746 B2 | 11/2016 | Prakash |
| 9,749,360 B1 | 8/2017 | Irimie et al. |
| 2003/0231207 A1 | 12/2003 | Huang |
| 2004/0107345 A1 | 6/2004 | Brandt et al. |
| 2004/0236874 A1 | 11/2004 | Largman et al. |
| 2005/0183143 A1 | 8/2005 | Anderholm et al. |
| 2005/0257261 A1 | 11/2005 | Shraim et al. |
| 2006/0053203 A1 | 3/2006 | Mijatovic |
| 2006/0168066 A1 | 7/2006 | Helsper et al. |
| 2007/0027992 A1 | 2/2007 | Judge et al. |
| 2007/0271613 A1 | 11/2007 | Joyce |
| 2008/0222728 A1 | 9/2008 | Chavez et al. |
| 2008/0244715 A1 | 10/2008 | Pedone |
| 2009/0013374 A1 | 1/2009 | Tsai |
| 2009/0089859 A1 | 4/2009 | Cook et al. |
| 2009/0158430 A1 | 6/2009 | Borders |
| 2009/0241168 A1 | 9/2009 | Readshaw |
| 2009/0328224 A1 | 12/2009 | Hernacki et al. |
| 2010/0146615 A1 | 6/2010 | Locasto et al. |
| 2010/0211641 A1 | 8/2010 | Yih et al. |
| 2010/0235918 A1 | 9/2010 | Mizrahi et al. |
| 2010/0313266 A1 | 12/2010 | Feng et al. |
| 2011/0167011 A1 | 7/2011 | Paltenghe et al. |
| 2012/0066498 A1 | 3/2012 | Engert |
| 2012/0124671 A1 | 5/2012 | Fritzson et al. |
| 2012/0278887 A1 | 11/2012 | Vitaldevara et al. |
| 2013/0232576 A1 | 9/2013 | Kamikis et al. |
| 2014/0041029 A1 | 2/2014 | Zhou |
| 2014/0082726 A1 | 3/2014 | Dreller et al. |
| 2014/0157405 A1 | 6/2014 | Joll et al. |
| 2014/0199664 A1 | 7/2014 | Sadeh-Koniecpol et al. |
| 2014/0201836 A1 | 7/2014 | Amsler |
| 2014/0259158 A1 | 9/2014 | Brown et al. |
| 2015/0067833 A1 | 3/2015 | Verma et al. |
| 2015/0287336 A1 | 10/2015 | Scheeres |
| 2016/0057167 A1 | 2/2016 | Bach |
| 2016/0119376 A1 | 4/2016 | Scozzaro et al. |
| 2016/0301705 A1 | 10/2016 | Higbee et al. |
| 2016/0308897 A1 | 10/2016 | Chapman |
| 2016/0330238 A1 | 11/2016 | Hadnagy |
| 2016/0337401 A1 | 11/2016 | Bendersky et al. |
| 2016/0344770 A1 | 11/2016 | Verma et al. |
| 2017/0085584 A1 | 3/2017 | Goutal |
| 2017/0195293 A1 | 7/2017 | Dahan et al. |
| 2017/0195363 A1 | 7/2017 | Dahan et al. |

OTHER PUBLICATIONS

"Advanced Spam Filtering Options," Microsoft Exchange Online Help, posted at https://technet.microsoft.com (Jun. 26, 2015).

"Message Header Analyzer," Microsoft Exchange Online Help, posted at https://technet.microsoft.com (Mar. 29, 2013).

"FAQ: Does ThreatSIM Include a Header that I can Search for in my E-Mail Server?", posted at www.threatsim.com Sep. 20, 2013.

Microsoft, "Prevent False Positive of Email Marked as Spam with a Safelist or Other Techniques," posted at httpr://support.office.com, accessed Jun. 6, 2016.

Graves, "Phishing Defenses for Webmail Providers," the SANS Institute Jan. 20, 2013.

Trevino, "Spam Filtering Through Header Relay Detection," Brigham Young University, Mar. 2007.

Handl, Thesis: "Spam Identification Independent of Body Contents," Czech Technical University in Prague, Jan. 5, 2010.

Parno et al., "Phoolproof Phishing Prevention", Carnegie-Mellon University, Dec. 3, 2005.

Nist, "Risk Management Framework (RMF) Overview," published Apr. 3, 2013.

Burri, N., Thesis: "Spamato, a Collaborative Spam Filer System" Swiss Federal Institute of Technology Zurich, Nov. 4, 2003.

Schlachter, S., Thesis: "Spamato Reloaded, Trust, Authentication and More in a Collaborative Spam Filter System" Swiss Federal Institute of Technology Zurich, Feb. 18, 2004.

Wombat Security Technologies, Inc., "Leading Computer Science University Takes Multi-Pronged Approach to Combat Phishing; Deploys Wombat Security's Highly Effective Suite of Training and Filtering Products" dated Mar. 10, 2011, available at: https://www.wombatsecurity.com/press-releases/leading-computer-science-university-takes-multi-pronged-approach-combat-phishing.

Wombat Security Technologies, Inc., "Case Study: Carnegie Mellon University—A Multi-Pronged Approach to Combat Phishing" dated Mar. 2011.

Wombat Security Technologies, Inc. "PhishGuru Phishing Attack Simulation Service" May 2012.

Wombat Security Technologies, Inc., "An Empirical Evaluation of Phishguru™ Embedded Training" dated Apr. 2009.

Wombat Security Techonologies, Inc., "PhishGuru: Operations Manual" dated Aug. 30, 2010.

Wombat Security Technologies, Inc., "PhishPatrol—A Purpose-built Filter to Catch Those Crafty Spear Phishing Emails That Make It Past Other Email Security" dated Apr. 2012.

Wombat Security Technologies, Inc., "PhishPatrol™ SpamAssassin Plugin Operations Manual" dated May 1, 2011.

Wombat Security Techonologies, Inc., "Anti-Phishing Phyllis Training Game, Teaches Employees How to Identify Traps in Emails" dated 2011.

Wombat Security Technologies, Inc., "Anti-Phishing Phyllis™ Instructions" dated 2010.

Rashid, F. Y., "Review of Wombat Security Technologies PhishGuru™" PCMag.com, dated May 16, 2014, available at http://uk.pcmag.com/security-reviews/53269/news/phishguru.

Albrecht, K., Dissertation: "Mastering Spam A Multifaceted Approach with the Spamato Spam Filter System" submitted to the Swiss Federal Institute of Technology Zurich, dated 2006.

Fette et al., "Learning to Detect Phishing Emails", World Wide Web Conference Committee, May 8-12, 2007, Banff, Alberta, Canada.

Albrecht, K. et al., "Spamato—An Extendable Spam Filter System" CEAS 2005—Second Conference on Email and Anti-Spam, Jul. 21-22, 2005, Satnford University, California.

Wombat Security Technologies, Inc., "PhishGuru Best Practices" 2012.

ADVANCED PROCESSING OF ELECTRONIC MESSAGES WITH ATTACHMENTS IN A CYBERSECURITY SYSTEM

RELATED APPLICATIONS AND CLAIM OF PRIORITY

This patent document is a continuation of, and claims priority to, U.S. patent application Ser. No. 15/239,688, filed Aug. 17, 2016, the disclosure of which is fully incorporated by reference.

BACKGROUND

This disclosure relates to methods and systems for implementing a cybersecurity protection framework in a system of networked electronic devices that are in communication with each other and with external systems.

Phishing attacks that use a malicious attachment in order to compromise a recipient's computing device or connected system have been part of the most prominent computer network security breaches in recent years. To help reduce these attacks, information technology professionals want to be able to conduct controlled test to evaluate their users' susceptibility to attachment-based phishing attacks. In the training and testing context, it is desirable to deliver a variety of attachment file formats in order to both track which users opened the attachment and also deliver appropriate training to the users who open the attachment. However, because files that are attached to electronic messages can exhibit a wide variety of file formats, implementing this can be a challenge because it requests that the user's computing device include the application that rendered the attachment (e.g., Microsoft Word, Excel, or Adobe Acrobat) and that each such application include a means for reporting that the user opened the attachment.

This document describes devices and methods that are intended to address at least some issues discussed above and/or other issues.

SUMMARY

In an embodiment, a system manages computer security risks associated with message file attachments in a cybersecurity network. The system includes a client computing device having a processing device, a user interface, and a messaging client configured to cause the client computing device to receive electronic messages and present the electronic messages to a user on a display device. The system also includes a computer-readable medium portion storing programming instructions that are configured to cause the client computing device to receive, via the user interface, an indication that a user has attempted to actuate an attachment to an electronic message that the messaging client has received. The instructions are configured to prevent the attachment from actuating on the client computing device until the system determines whether the received message is a legitimate message or a potentially malicious message. Additional instructions will cause the client computing device or a remote computing device to determine whether the received message is a legitimate message or a potentially malicious message, notably without processing the attachment. If the system determines that the received message is a legitimate message, the system will permit the attachment to actuate on the client computing device. If the system determines that the received message is not or may not be a legitimate message, the system will continue preventing the attachment from actuating on the client computing device.

In some embodiments, the system may include a message origination server configured to generate and transmit mock malicious messages with mock malicious attachments. The system also may include additional programming instructions that are configured to cause the client computing device to, for any message that the system determines is a legitimate message that is one of the mock malicious messages: (i) analyze a header section of that message to detect an identifier that can be used to identify a user or device to which that message was directed, wherein the identifier comprises a value of a "TO" field in the header section, a device code, or a user identifier; and (ii) send the detected identifier to a cybersecurity analyzer server for recording in a data store information indicating that the user attempted to open an attachment to a mock malicious message.

In some embodiments, the system may include additional programming instructions that are configured to cause the client computing device or remote computing device to cause the client computing device to output a prompt to the user. The prompt may include a result of the determination of whether the received message is a legitimate message or a potentially malicious message. The system also may further analyze the received message to assign a class to the received message; and include information corresponding to the assigned class in the information that is included in the prompt.

In some embodiments, when determining whether a received message is a legitimate message or a potentially malicious message, the system may: select a structural element of the received message; obtain information corresponding to the structural element; and use the obtained information to assign a trust value to the structural element. When outputting a prompt to the user, the system may present the user with the structural element, and descriptive material corresponding to the obtained information, to train the user about how the structural element can help indicate why the received message is a legitimate message.

In some variants of the embodiments described above, if the structural element comprises a hyperlink, then when obtaining information corresponding to the structural element the system may access a domain name registrar to retrieve information that indicates an age of a domain associated with the hyperlink. In other variants, if the structural element comprises a hyperlink, the system may identify a domain name registrar for a domain associated with the hyperlink, and it may access a data set of known domain name registrars to identify whether the registrar is known to register malicious websites. In other variants, if the structural element comprises multiple hyperlinks, the system may determine a number of redirects associated with the hyperlinks.

In some embodiments, the system may include a message origination server configured to generate and transmit mock malicious messages with mock malicious attachments. If so, then when assigning a class to the received message the system may, for any received message that is one of the mock malicious messages generated by the message origination server, assign a mock malicious message class to the received message. For example, the system may determine that received message is one of the mock malicious messages if: (i) a header field of a header section of the received message starts with a predetermined key; and (ii) for any header field that starts with the predetermined key, that header field also a includes a value that satisfies a first trusted sender rule. As a condition of determining that a received message is one of the mock malicious messages, the system may also require that an additional element of the received message satisfies a second trusted sender rule. Examples of such second trusted sender rules include: (a) a requirement that any header field having a FROM fieldname include a value that is associated with a known sender; (b) a requirement that any header field that includes a domain have a value that is associated with a known domain; or (c) a requirement that any header field having a FROM fieldname include a value that is associated with a known sender, and a requirement that any header field that includes a domain have include a value that is associated with a known domain.

In some embodiments, when the system prevents an attachment from actuating on the client computing device until the system determines whether the received message is a legitimate message or a potentially malicious message, the system may quarantine the received message and it may release the received message from quarantine only if and after determining that the received message is a legitimate message.

DETAILED DESCRIPTION

Figure 1:
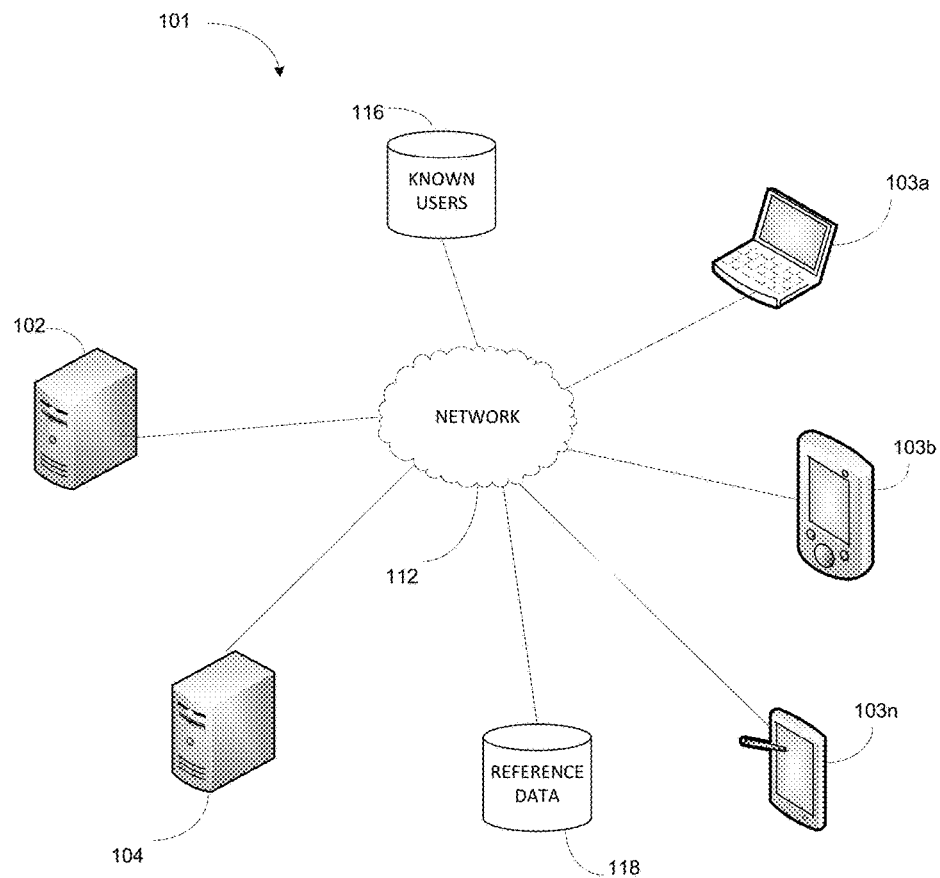
FIG. 1 depicts a cybersecurity network according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

For the purposes of this document, the terms "electronic device" and "computing device" interchangeably refer to a device or system of one or more devices that includes at least one processor and non-transitory, computer-readable memory. The memory may contain programming instructions that, when executed by the processor, cause the device to generate, receive or analyze messages according to the programming instructions. Examples of computing devices include networked servers, personal computers, gaming systems, televisions and other electronic display devices, wearable electronic devices (such as smart watches and activity bracelets), electronic devices configured to connect to each other in a network (as in an Internet of Things arrangement) network infrastructure devices (such as servers, routers, switches, and the like), as well as Internet of Things devices and systems (such as sensors, virtual sensors, controllers, actuators, building management systems, robots, intelligent transportation systems, smart grids, smart cars, drones, and the like), implantable electronic devices, and portable electronic devices such as smartphones, personal digital assistants, cameras, tablet computers, laptop computers, media players and the like. Where appropriate for the context, the term "electronic device" or "computing device" also may refer to a software application configured to operate on an electronic device, or firmware that is installed in an electronic device. In some embodiments, specialized electronic devices other than general purpose computing devices may be used. Examples include a smartphone having a transceiver that may send and receive messages via wireless communications capability; a computing device having a wireless network transceiver that can connect to and exchange communications with other devices via a wireless network access device; a media player; a wearable electronic device such as a smart watch or smart eyewear having a processor, display and user interface; and the like.

When used in this document, the term "processor" refers to logic circuitry that is configured to implement programming instructions that cause an electronic device to perform various functions. Unless specifically stated otherwise, the term "processor" can refer to a single processing device or to multiple processing devices that together implement various steps of a process.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

In this document, the term "mock malicious message" refers to a message containing one or more elements that are configured to test, train or assess an electronic user's adherence to safe cybersecurity practices. Mock malicious messages will be simulated malicious messages that contain one or more elements that may be found in actual malicious messages. These elements are designed to lure the user into performing an action that can compromise the user's or a network's security and/or allow a third party to access sensitive information about the user or the user's organization. Examples of mock malicious messages include: simulated phishing emails or text messages; spoofing messages that appear to originate from a known entity or an official entity (such as a government agency or financial institution); emails containing mock malicious executable or other mock malicious attachments; and/or other electronic messages containing a prompt intended to lure the user to initiate an action on the user's device that could compromise system or data security if the message were actually malicious. In the embodiments of this disclosure, mock malicious messages will include one or more attached electronic files that can be opened, executed or otherwise activated by the recipient. The attached electronic files will be "mock malicious attachments" in that they will not actually cause harm to the user's computer or system, but they will simulate a type of attachment that could cause harm if it were actually malicious.

In this document, the term "trusted entity" or "trusted sender" refers to a person or system that is known to or considered by the user, to the user's messaging client, or to a cybersecurity analyzer server as an entity that is highly unlikely to send an actual malicious message to the user. Examples of trusted entities include those having an address or address components that appear on a whitelist of trusted entities, or entities that are part of an organization to which the user belongs (such as a company or group of affiliated companies).

In this document, the term sender policy framework (or SFP) refers to a Domain Name System (DNS) text entry which shows a list of servers that are considered to be permitted to send messages for a specific domain. SPF is a DNS entry and can also be considered a way to enforce the fact that the list is authoritative for the domain, since an entity's administrators may the only people allowed to add/change that list's domain entries.

In this document, the term Domain Keys Identified Mail (DKIM) refers to an email authentication method designed to allow the email receiver to check that an email claimed to come from a specific domain was indeed authorized by the owner of that domain. This is achieved by an implementation of a public/private key signing process. The embodiments of this document encompass both DKIM as it is known at the time of this filing and future updates to the DKIM method that become generally accepted in the art.

In this document, the term Domain-based Message Authentication, Reporting & Conformance (DMARC) refers an email authentication protocol, and represents a collection of techniques that are designed to verify the identity of a sender of a message. DMARC may utilize the SPF and DKIM protocols and adds a reporting and policy function that allows senders and receivers to review if the mail messages adhered to the attributes of a specific domain. The embodiments of this document encompass both DMARC as it is known at the time of this filing and future updates to the DMARC method that become generally accepted in the art.

In this document, the term "malicious message" refers to a message containing an actuatable element that, if actuated by a recipient of the message, can put the recipient or the recipient's organization at risk by harming computer networking equipment, destroying or altering stored data, transmitting stored data or otherwise making the data accessible to a third party, causing the recipient's messaging client to automatically forward the message or generate and send other malicious messages to the recipient's contacts, or taking some other action that compromises network, data or network-connected device security. Such actuatable elements can include (1) attachments that, if opened or selected, will cause the user's computing device to execute a malicious action; (2) hyperlinks to websites or Internet addresses that contain malicious functions (such as functions that invite the recipient to enter login credentials or disclose other sensitive information while appearing to be a legitimate website, functions that cause malware to be downloaded to the recipient's electronic device, or functions that prompt the recipient to carry out some action that will compromise system or data security).

Conversely, a legitimate or non-malicious message is a message that is not malicious. The determination that a message is non-malicious (or legitimate) may be the result of an automated analysis, including an analysis to determine whether the sender of the message is a trusted sender, or whether the message is a mock malicious message, or it may be the result of a more comprehensive analysis that looks at a broader set of attributes associated with a message (e.g., detection of malware in an attachment, detection of malicious hyperlinks in a message, age of the domains associated with hyperlinks in a message, reputation of the registrar associated with different hyperlinks in a message, language used in the message, etc.).

With reference to FIG. 1, in one embodiment, a cybersecurity network 101 may include a message origination server 102, one or more client computing devices 103a . . . 103n, and a cybersecurity analyzer server 104. The message origination server 102 is a computing device that includes a processor and programming instructions that are configured to cause the processor to generate or select and send one or more mock malicious messages with a mock malicious attachment to one or more of the client devices via one or more wired or wireless networks 112. The mock malicious messages may be simulated phishing emails, and/or other electronic messages (such as emails, short messaging service or SMS, MMS, instant messages, in-channel messages delivered by a service such as a social networking site, or electronic messages delivered using some other messaging technology) containing a mock malicious attachment. The cybersecurity analyzer server 104 is a computing device with processor and programming instructions that are configured to enable the server to receive, process, classify and forward messages that it receives from client computing devices.

In various embodiments, the cybersecurity analyzer server 104, the message origination server 102, or both may have access to a user database 116 containing identifying information about one or more users of the system who may receive messages and report the messages to the cybersecurity analyzer server. Information in the user database may include a message delivery address (e.g., email address), social media account information, mobile device phone number, or the like. The system may also include or have access to one or more remote or client-installed data sets of reference data 118 that the cybersecurity analyzer server or a client computing device may access when analyzing and classifying messages. The reference data may include trusted senders, messages or message components previously received from trusted senders, domain registrar information, or other information, examples of which will be described in more detail below.

Figure 4:
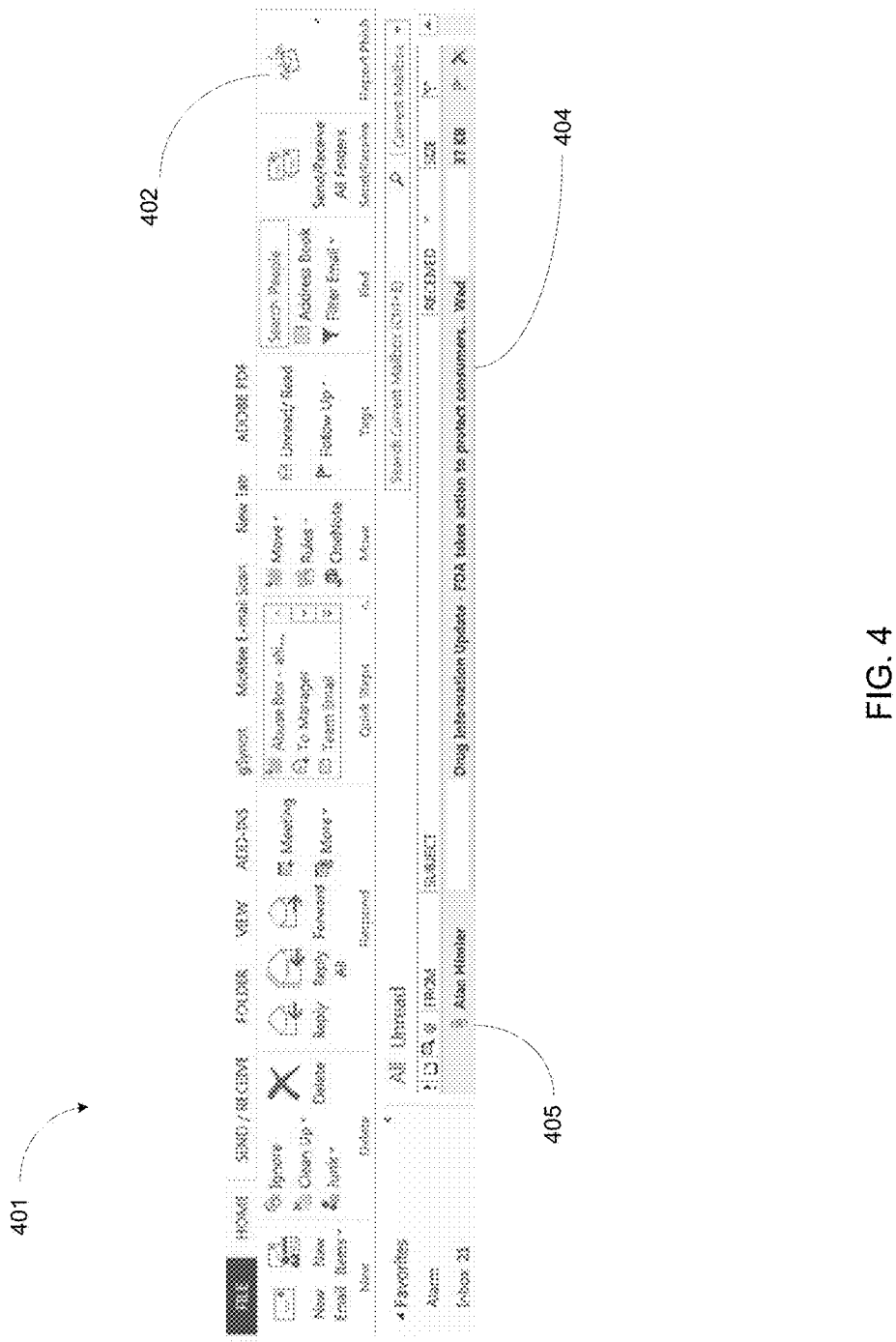
FIG. 4 depicts an example of various components of a messaging client on a client computing device.

Each client computing device (e.g., 103a) includes a messaging client that receives electronic messages, including but not limited to the mock malicious messages originating from the message origination server 102, and presents the messages to the user for review via a user interface. The messaging client's user interface will include an input that permits a user to select and actuate messages and message attachments. Example messaging clients include e-mail clients, SMS messaging clients, social media messaging applications, or other client applications that receive and display messages for the device's user to review. Example user interfaces include touch-screen displays, keyboards, touch pads, computer mice, pointing devices, microphones and speech recognition software, and other devices, When the messaging client of the client computing device 103a receives a message, it will display the message in an inbox or other structure of the messaging client that permits the user to take an action. An example of this is shown in FIG. 4, which shows a messaging client with an inbox that displays an electronic message 404 with an attachment 405 electronic file.

Optionally, the messaging client on the client computing device may include a reporting function that enables a user of the messaging client to report a potentially malicious message to the cybersecurity analyzer server. The reporting function may be a message forwarding feature that forwards the potentially malicious message to a predetermined address where the message will be received by the cybersecurity analyzer server. This may be implemented as, for example, a reporting button as a plug-in in an email tool such as Outlook (a trademark of Microsoft) or other messaging client's toolbar, a selectable option in the messaging client's actions menu (e.g., the menu that includes message forward, reply, and similar functions), or in some other way. An example of this is shown in FIG. 4, which illustrates a toolbar 401 of a messaging client, with a user-selectable reporting button 402 which, when actuated by a user, will cause the messaging client to process a highlighted or otherwise selected message, either in connecting with detecting that a user has activated the reporting button or regardless of whether the user has activated the reporting button.

The messaging client on the client computing device also may include a plug-in or other appropriate programming instructions that cause the messaging client or another application on the client computing device to perform certain analyses when a user attempts to open or otherwise activate an attachment to an electronic message that is in the messaging client's inbox. Returning to FIG. 1, when a message attachment is actuated by a user, the messaging client or related application will analyze the message to determine whether it is legitimate or potentially malicious, and it may forward the message to a cybersecurity analyzer server 104 or other remote network device, either to conduct the initial analysis or to conduct additional analysis after initial analysis by the client. Once the analysis is completed, whether at the level of the client computing device or a remote computing device or a combination of both, the client device may output feedback to the user.

When the messaging client on the client computing device (e.g. 103a) analyzes a message for which a user actuated an attachment, the client computing device may determine whether the message is legitimate. If the message was a mock malicious message, the feedback may include an explanatory report stating that the message was a training message, that the attachment was a mock malicious attachment, and that the attachment could have compromised system security if it were an actual malicious attachment. If the system determines that the reported message is potentially malicious, it may send the user a notification and/or some or all of the reported message (e.g., the message's header, body and/or attachment) to a remote device on the network for analysis. If the system determines that the reported message is non-malicious or from a trusted sender, it may prompt the user with a message confirming that the reported message is non-malicious and it may allow the user to proceed with taking action on the attachment without forwarding or further reporting the message to the cybersecurity analyzer server 104. In this way, the opening of malicious message attachments may be reduced without actually having to analyze the attachments themselves, only the messages to which the files are attached. Details of various embodiments will be further explained in this document. It is also notable that while much of the present disclosure states that the client computing device performs the initial analysis, any or all of the analysis may be performed by a remote computing device if the client forwards the message or various components of the message to the remote computing device for analysis.

The messaging client also may be configured to further process legitimate messages and further classify them, such as by determining whether the message was trusted and originated from an internal sender or an external sender. Details of this will be described below. More generally, the analysis of messages for which a user attempts to activate an attachment can extend to the determination of whether the message is malicious or not, independently of whether it originates from a known trusted sender. This analysis may be performed at the level of the client computing device running the messaging client, or it may be performed at the level of a server, or a combination of both. It may also involve accessing one or more internal and external sources of information such as information from domain registrars, blacklists, servers maintaining reputation information, malware repositories (including repositories of malware signatures), caches storing some of this information or precomputed metrics intended to facilitate the detection of malicious and legitimate messages (e.g. signatures of known malicious messages, who-is data, statistics about the number of hyperlinks found in different types of malicious and legitimate messages, reputation of different domain registrars, etc.) Examples of how the system may use this information will be described below. In this way, the system can assess whether or not the attachment is potentially malicious before permitting the user to open the attachment, without analyzing or executing the attachments itself.

Figure 2:
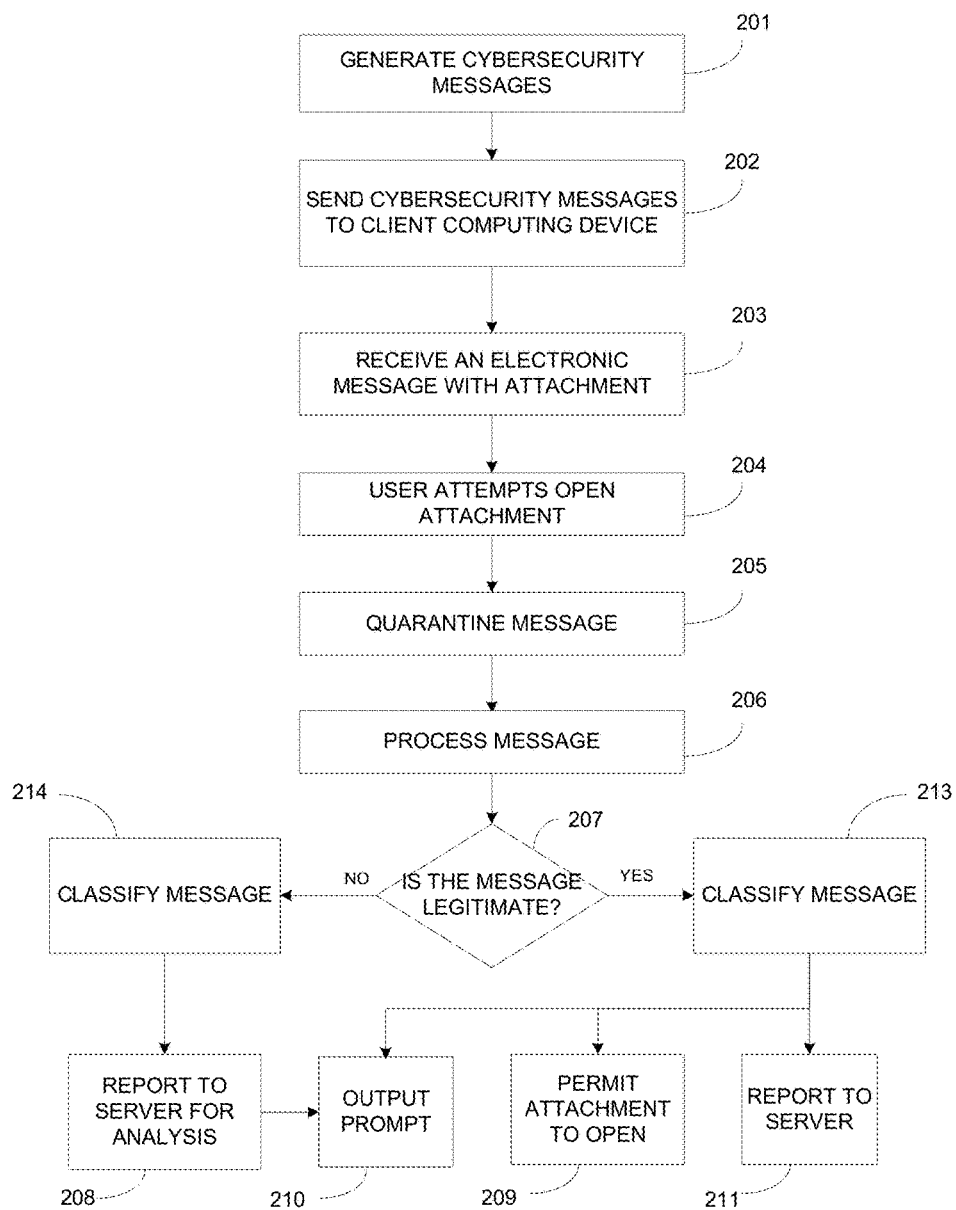
FIG. 2 is a flow diagram illustrating various actions that the system may take to reduce the reporting of non-malicious cybersecurity messages according to various embodiments.

With reference to FIG. 2, in an embodiment, a method implemented in a system described in FIG. 1 may include generating mock malicious messages with mock malicious attachments by a message origination server 201, sending the mock malicious messages with attachments to one or more client computing devices 202. A messaging application of a client computing device will receive an electronic message with an attachment 203. When the messaging client detects that the user attempts to activate an attachment 204 such as by selecting, clicking or double-clicking on it, the messaging client may prevent the attachment from opening such as by quarantining it 205 until after it processes the attachment's message 206 to determine whether the message is legitimate, such as by being one of the mock malicious messages generated by the cybersecurity server. If the client computing device determines that the reported message is not or may not be a mock malicious message or otherwise legitimate 207, it may forward the message or one or more components of the message (such as the attachment or a message header field) to a remote device or the cybersecurity analyzer server on a network for analysis 208. If the client computing device determines that the reported message is one of the mock malicious messages or otherwise legitimate, it may remove the message and/or attachment from quarantine or otherwise permit the attachment to open 209. The client computing device may also output a prompt to the user, such as a message confirming that the reported message is from a non-malicious or trusted sender 210.

Optionally, before generating the prompt, the client computing device or a remote device may classify the reported message 213 using rules such as those that will be described below in order to assign a class to the message. Classification also may occur before reporting a potentially malicious message to the cybersecurity analyzer server. It should be noted that these rules may be handcrafted or may be derived using statistical analysis techniques or machine learning techniques (e.g., using a corpus of both known malicious messages and known legitimate messages to train models that differentiate between both malicious and legitimate messages), or a combination of both. The class may be a label that identifies the message as being from an internal sender, a trusted external sender, or an unknown or potentially malicious sender, or of another class. Other examples of classes may further distinguish between different types of legitimate messages and/or different types of malicious messages such as: (1) a malicious phishing message that appears to be from the IRS; (2) a malicious message trying to entice a user with an offer that it is too good to be true; (3) a malicious message requesting the user to disclose sensitive information (such as entering login credentials for an account); (4) a malicious message disguising a malicious URL as a trustworthy URL; (5) a message with a malicious attachment, (6) a legitimate message from a particular known entity such as the recipient's system administrator, a legitimate message from a bank or entity with which the recipient has an account, or a legitimate message from a company vendor or customer; or (7) a legitimate message from an unknown entity but which, based on content analysis, is determined to be a simulated malicious message, or to have originated from a trusted source.

When displaying the prompt to the user 210, the prompt may identify the class of stored information corresponding to the identified class so that the user knows and can learn the class to which the message actually was assigned. The classes may include trusted and originating from a source that is internal to the user's organization or the cybersecurity analysis system's organization, trusted and originating from an external organization, untrusted (i.e., unknown and potentially malicious, or known to be malicious), unknown but not expected to be malicious, etc. Optionally, if the user highlighted or selected one or more particular elements of the message, the prompt may include information about those elements based on analyses as described below.

Optionally, the client computing device may also send a report to the cybersecurity analyzer server or another remote server 211. Optionally, the report may indicate that the user has selected an attachment to a mock malicious message generated by the message origination server.

When processing the message 206, the system may select one or more components of one or more header fields that the remote server can use to identify the user who attempted to actuate the attachment or the device on which the actuation attempt occurred. For example, the system may select a recipient address in a "TO" header field of the message and include the recipient address when sending the reports to the remote server 211. If the message was a simulated phish or other mock malicious message, the message origination server may have inserted an identification code in a header field of the message, and the client device may send that identification code with the report. Such codes may be an identification code that is unique to the message, a code that is unique for the user to whom the message was directed, or a device code for a device that will receive the message. The client device also may obtain a device identification code from a memory of the device. The client device may include any such identification codes when providing the report to the remote server. In addition, the client device may include related event information when providing the report to the remote server. Related event information is data that is descriptive of an event associated with an action that the client device or its user took or experienced as a result of the message, or descriptive of the attachment itself. Examples of related event information include a time stamp at which the message was received by the client device or the attachment selected by the user, a file size of the attachment, a file type of the attachment, or other actions that the client device took or experienced as a result of the message. Optionally, the client device also may include any of the identification information and/or related event information described in this paragraph when reporting a non-legitimate message to the cybersecurity analyzer server for analysis. Thus, the system may use this information and compare it to a database of known users or other information to log information indicating which users attempted to click a mock malicious email and when (or how often), or which users attempted to open attachments that may actually have been malicious if the system had not intervened with the protective steps described in this document.

Optionally, when a user attempts to open a potentially malicious attachment, the client computing device may quarantine the attachment (and optionally other components of the message) until the system's analysis is complete. This may be done by removing the attachment or entire message from the user's messaging client inbox, masking the attachment or the entire message in the messaging client, or adjusting a setting of the messaging client so that the user cannot open the attachment. If the message is determined to be potentially malicious, the client computing device may delete the message, optionally after sending it to the cybersecurity analyzer server. If the message is determined to be legitimate, the client computing device may release the attachment (and, if quarantined, the message) from quarantine and make it available to the user again. Optionally, the release from quarantine may occur only after the user has responded to the prompt, such as by clicking a button or taking some other action indicating acknowledgement of the prompt.

Figure 3:
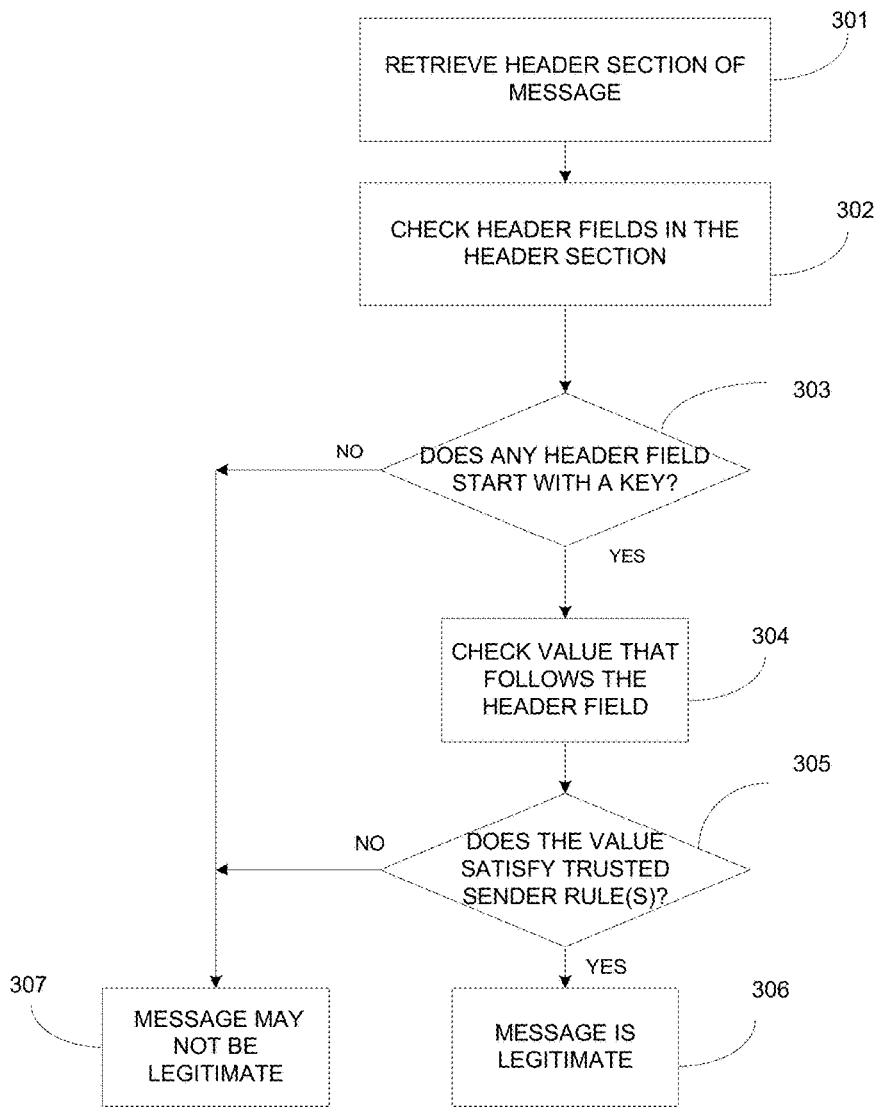
FIG. 3 illustrates various actions that the system may take to determine whether a reported message is a mock malicious message according to various embodiments.

With reference to FIG. 3, in one embodiment, the method of determining whether a message is a known mock malicious message may include retrieving one or more header fields (which may include an actual header field and/or an identifier within a header) of a header section of the message 301, checking the one or more header fields 302, determining whether any header field of a header section of the received message starts with a predetermined key 303, and if a header field starts with the predetermined key, further checking the value that follows the header field 304, determining whether the value that follows the predetermined key satisfies a trusted sender rule 305. If the value that follows the header field satisfies the trusted sender rule, determining that the message is a mock malicious message 306; otherwise, determining that the message is not a known mock malicious message 307. If the system determines that no header field of any header section of the received messages starts with any predetermined key, it may also determine that the message is not a known mock malicious message 307.

Returning to FIG. 1, in one embodiment, the message origination server 102 may be a simulated phishing message server, in which case the mock malicious message is a simulated phishing message. For example, the message origination server can be an anti-phishing education system that assesses and trains employees utilizing simulated phishing emails. It can be configured to allow enterprise users to send very realistic mock phishing emails to their employees. The instant an employee falls for the mock phishing email the cybersecurity server creates a teachable moment when the employee is open to learning. The system may leverage this moment by providing just-in-time training on what the employee did wrong, and how they can recognize and avoid future malicious attacks. The training messages can be customized to capture attributes associated with different categories of malicious and legitimate messages such as those recognized by the message classification process disclosed earlier in this document.

In one embodiment, the phishing messages may contain one or more headers each containing various header fields and values to be used by the computing device (either on server or client device) to process the phishing message. For example, the phishing message server may generate simulated phishing emails with a key-value pair that consists of the phrase "X-Mailer: Known Mailer" in which X-Mailer is the key and Known Mailer is the value. In other examples, the phishing message server may generate simulated phishing emails, each of which includes key-value pairs that include a known key followed by a globally unique identifier (GUID), where the GUID is unique to the user to whom the message was sent, unique to the sender, which has a predetermined known format, or which is paired with one or more additional GUIDs that satisfy one or more of these rules.

In one embodiment, the client computing device may implement various functions in an email plug-in, such as an integrated Outlook (a registered trademark of Microsoft) plug-in, which will allow an employee or an email recipient to identify a potential phishing attack and report the potential phishing attack via a network. In one example, the client email plug-in can appear on the client user interface of the email application, such as Outlook, as an email reporting button. The email reporting button will give the email recipient/user the ability to report suspected phishing emails to a security and incident response team. The phishing email client can automatically provide positive behavior reinforcement by immediately providing the user with a notification that will be distinctly associated with the class of message to which the classifier assigned the message.

In one embodiment, in determining whether a message for which a user attempted to actuate an attachment is a known mock malicious message generated by the cybersecurity message server, the client may look for one or more specific keys in the header and extract the values associated with each key. For example, if the value associated with an "X-Mailer" key is "Known Mailer," a known GUID, or a GUID of a known format, the client device may conclude that the email is a training message or simulated malicious message generated by the cybersecurity message server.

Alternatively, and/or additionally, the messaging client plug-in or programming instructions on the client computing device may be configured to determine whether a message is from a trusted source. In one embodiment, a trusted source may be an internal trusted sender, a trusted external sender, or an unknown external sender, and various characteristics may be examined for messages from different types of sources. For example, one or more of the following identifying characteristics will be examined for a designation of a trusted internal sender, such as an internal email, a X-header, the "From" header field, a domain name and an email body identifier.

In one embodiment, the content of an email message can embed an email body identifier that can be a unique identifier of the sender. For example, the identifier could take the form of an alphanumeric unique identifier, e.g. a Known ID, placed into one or more of the mime parts of the email. The presence of this unique identifier would mean the email is considered coming from a trusted source.

Some embodiments could classify the message or determine whether or not it originated from a trusted sender by performing one or more analyses on the content of one or more of the mime parts of the message body. As an example, the system may compare the text of a message body to the text of message bodies from trusted senders and analyze how similar they are. The system may do this using any now or hereafter known comparing techniques, such as hashing, probabilistic hashing, or vector space models. The system may assign a similarity score based on the analysis and consider the message to be trusted if it has a similarity score of at least a threshold amount when compared to a trusted message. In some embodiments, a comparison and similarity score may be verified by another type of analysis, or another type of analysis may be used instead of a direct comparison.

An example of another type of analysis involves using statistical linguistic analysis to train classifiers to automatically identify linguistic elements indicative of malicious messages. Examples of such linguistic elements include lures such as promise of rewards (e.g. "win a free trip", "congratulations you have won an iPhone"), threats (e.g. "your account will be disabled", "your pictures will be deleted", "your account will be delinquent"), calls to action (e.g, "change your password", "enter your credit card details"), time critical elements (e.g., "change your password by tomorrow or your account will be disabled"). Training of such models can be done using a corpus of both legitimate and malicious messages where these linguistic elements have been manually labeled. Messages in the corpora can be pre-processed with tokenization techniques, removal of "stop words", stemming, "Term Frequency/Inverse Document Frequency" (or TF-IDF) and other relevant pre-processing techniques. In some embodiments statistical linguistic analysis techniques rely on simple logistic regression models. In other embodiments, they rely on more sophisticated statistical inference techniques to build classifiers, including techniques such as Bayesian inference techniques (e.g. Naïve Bayes), Support Vector Machines, Decision Tree Learning techniques (e.g., decision tree algorithms such as C4.5, ID3, Conditional Inference Trees and the like, or ensemble methods such as random forests, bagging, boosted trees and the like). These supervised learning models can also be further enhanced using boosting techniques and the use of unsupervised learning techniques (e.g. Topic Modeling and use of Latent Dirichlet Allocation). In other embodiments, some elements of the learned models can be developed using deep learning techniques. These statistical linguistic analysis techniques can also be further enhanced with semantic parsing techniques and other natural language processing techniques and classifiers trained to recognize patterns of linguistic elements indicative of malicious or legitimate messages.

Results can also be used to provide feedback to users who attempted to actuate an attachment and help them better understand why ultimately the message was determined to have or not have the linguistic attributes typical of malicious messages (e.g. "The message you reported did indeed look malicious as it included an offer, namely to win a free trip, a call to action, namely a request for your credit card credentials, and a time critical element in the form of a 24 hour deadline"). The system can generate such messages automatically using one or more templates (e.g. "the message you reported did indeed look malicious as it included the following elements" <if linguistic element indicative of offer was detected, insert this element here and "(lure in the form of an offer)">, <insert linguistic element indicative of call to action here and "(call to action)">, <if time critical element was detected, insert time critical element here and "(a deadline to entire you to act promptly)">.

Yet another type of analysis can rely on rules that look at one or more structural (or non-linguistic) features of a message. In some embodiments, the system may create a score using the value of any of all of these features. These values may be categories, numbers or, where the score is created using a sum of the values (when the values are numerical), a weighted sum of the values (in which some values are adjusted up or down by a weighting factor), or use a value generated based on some other function that takes the feature values as input. The features may include any or all of the following, as well as other features:

Factor 1: Age of the (Web) domains found in the body of a message. The system may access a domain registrar service or a database of known domain registrations and issue a service call requesting a first registration date for any domain found in the body of a message. If the registration date indicates that the age is below a threshold (such as one month), the system may assign a lower trust value (e.g., zero) to this factor for the message, and a higher trust value (e.g., 1) to this factor for the message if the age is above the threshold. Optionally, multiple thresholds may be used, with different values assigned for domains that are above various thresholds (example: value=0 if the domain is less than one month old; value=0.5 if the domain is from one to six months old; or value=1 if the domain is over six months old).

Factor 2: The number of links found in a message and/or the number of domains associated with links in a message. The system may assign a trust value that corresponds to a function of either of these numbers, e.g., trust value=1 if no links or domains are found, trust value=0.5 if one link or domain is found, trust value=0.2 if two or more links are found.

Factor 3: The particular registrar with which each domain is registered. For example, the system may maintain or have access to a data set identifying registrars that are more commonly associated with malicious messages than others, and registrars that are not commonly associated with malicious messages. The system may access a domain registrar service or a database of known domain registrations and issue a service call requesting the identity of a registrar for any domain found in the body of a message. The system may then determine whether a match for the identify is in the data asset, and if so, it may assign a value for this factor based on a measure of the extent to which the data set identifies the registrar as being known (or not known) to the associated with malicious websites. In this way, the system can maintain information about the reputations of registrars and use this information as a factor to determining a trust score for the message.

Factor 4: The number of levels of redirection associated with links in the message. A message with a larger number of links that correspond to redirections may be assigned a lower trust value for this factor, and be indicative of malicious messages. For example, the system may employ a redirect check tool to access an address associated with a link and determine whether the linked address employs a redirect to a different address. Different trust values may be assigned based on the number of redirected links that the message contains (example: value=1 if no redirect; value 0.5 if one redirect; or value=0 if two or more redirects).

Factor 5: The presence of IP-based URLs. Some malicious messages are hosted out of compromised computers, which may not have DNS entries. Thus, the presence of non-matching URLs in the body of a message (e.g. a link that displays as amazon.com but links to malicious_site.com, such a link would look like <a href="malicious_site.com">amazon.com</a>)), and the presence of links labeled "here", "link", or "click" that point to non-modal domains, namely domains other than the one of the sender of the message. Different trust values may be assigned based on the number of such URLs that the message contains (example: value=1 if no such URLs; value 0.5 if one such URL; or value=0 if two or more such URLs).

Factor 6: Whether the body of a message code contains certain code elements (e.g., HTML or javascript content) known to be commonly found in malicious messages. The system may do this by accessing a data set of known malicious message code, and determining whether one or more code elements of the message are in the data set. The system may assign a trust value to this factor that is a function of the number of known malicious code elements that the message contains (e.g. trust value=1 if no such code elements, trust value=0.5 if one or two such code elements, or trust value=0 if three or more such code elements).

Factor 7: Whether the message contains one or more attachments and whether such attachments contain malware. The system may perform a separate analysis to determine whether the attachment contains malware (e.g. by matching the file against malware signatures or opening the attachment in a sandboxed environment).

Factor 8: As another example, the system may identify a sender history—i.e., determine whether it has seen messages from the sender before based on stored data (such as a message log). If so, the system may determine whether one or more characteristics of the new message (e.g. headers, body, style, font, attachments, etc.) resemble the sender's previous messages. The system may do this by maintaining a data set of previously-received messages (or known senders) and comparing these elements of the received massage to the corresponding elements in the data set, and it may assign a value using an algorithm similar to that described above for other factors.

In some embodiments the system may calculate a score that is a sum, a weighted sum, or some other function of the factor-specific values determined using any or all of the above examples, optionally in addition with other criteria such as those described below, and consider the message to be legitimate if the overall score exceeds a threshold.

Using a corpus of labeled malicious and legitimate messages, classifiers can be trained to use these features to distinguish between malicious and legitimate messages based on the value of these and other message features. These models can also be trained to incorporate linguistic elements and other features identified herein. Alternatively, rules to determine how to interpret the value of these features in determining whether a message is malicious or not can also be handcrafted (e.g. "if a message includes an attachment that contains malware, flag it as malicious", "if a message includes a link with more than 4 levels of re-direction, flag it as malicious").

In another example, one or more of the following identifying characteristics will be examined for a designation of a trusted external sender (partner), such as an external email: a X-header, an email body identifier (e.g. Known ID) in the body of the email, a domain name, the "From" header field, SPF, DMARC and DKIM. These characteristics could also be incorporated in the machine learning models discussed above.

Determining whether a message with an attachment is from a trusted sender may include determining whether the message satisfies one or more trusted sender rules using one or more of the aforementioned identifying characteristics, as are further explained in various embodiments below. In one embodiment, the system may retrieve an extension field of a header of the message, such as an X-header in an email message, to determine whether the field name of the header field matches a predetermined key. For example, the system may look for a header field "X-Mailer," and if successful, determine whether the value in the header field has a pre-determined known value. If the value in the header field matches the pre-determined known value, the system may determine that the message satisfies a trusted sender rule or that the message is from a trusted internal sender. In one embodiment, the pre-determined known value may be included in the programming instructions.

In an embodiment, the system may also extract various portions of a message and use those data to determine whether a message is from a trusted sender. For example, the system may examine the "From" field of an email and compare the value of the "From" field with a whitelist in a data store. If the value of the "From" field matches any item in the whitelist, the system determines that the message satisfies a trusted sender rule or that the message is from a trusted sender. In another example, the system may examine a domain found in an email and compare the value of the domain with a whitelist in a data store. If the value of each domain is found in the whitelist, the system determines that the message satisfies a trusted sender rule or that the message is from a trusted sender. In another example, the system may examine any portion of the email body and check whether the email body includes a predetermined known identifier. In one embodiment, the known identifier can be, for example, a special alphanumerical value such as a Known ID. In another embodiment, the known identifier can be of a particular known format, for example, a six-digit hexadecimal string. The predetermined known identifier can be included in the programming instructions in the system.

Alternatively, and/or additionally, the system may include a data store that contains a list of IP addresses or DNS names of servers that are authorized to send emails for a given domain. The system may identify a header field, such as "From" header field, and identify the domain name associated with the sender, such as an IP address or a DNS name, in the header field, and compare it with the data store to validate that at least one of the servers that were involved in the delivery of this mail are authorized to send mail for the domain of the from email address. If the IP address or the DNS name of the sender is validated, the system may determine that the message satisfies a trusted sender rule or that the message is from a trusted sender.

Alternatively, and/or additionally, the system may use Sender Policy Framework (SPF) to determine whether a message is from a trusted sender. In this embodiment, the system may identify an Internet protocol (IP) address in a header field of the header section, such as the "From" header field, and determine whether a SPF record has been published with a domain corresponding to the IP address. If the SPF record has been published with a domain corresponding to the IP address, the system may then determine that the message satisfies a trusted sender rule or that the message is from a trusted sender.

Alternatively, and/or additionally, the system may also use Domain Keys Identified Mail (DKIM) to determine whether a message satisfies a trusted sender rule. In this embodiment, the system may verify the value in the "DKIM-Signature" header field using DKIM. In another embodiment, the value in the "DKIM-Signature" header field may be encrypted, and the system may further obtain a public key and use the public key to verify the digital signature associated with the sender by using DKIM. If the verification succeeds, the system may determine that the message satisfies a trusted sender rule or that the message is from a trusted sender.

Alternatively, and/or additionally, the system may use Domain-based Message Authentication, Reporting & Conformance (DMARC) to determine whether a message is from a trusted sender. In this embodiment, the system may identify the "From" header field of a header of the message and determine whether the value of the header field is aligned with an authenticated domain using DMARC. If an alignment is found, the system may determine that the message satisfies a trusted sender rule or that the message is from a trusted sender.

The system may use one or more of the trusted sender rules, or a combination there of, to determine whether a message is from a trusted source or trusted sender. In one embodiment, determining whether a message is from a trusted internal sender may include determining whether the message satisfies one or more trusted sender rules such as (1) a rule based on X-header alone, (2) a rule based on X-header, "From" header field and Domain, (3) a rule based on the email body identifier alone, or (4) a rule based on the email body identifier (e.g. Known ID), "From" header field and Domain. In another embodiment, determining whether the message is from a trusted external sender (partner) may include determining whether the message satisfies one or more trusted sender rules such as (1) a rule based on X-header alone, (2) a rule based on the email body identifier (e.g. Known ID) alone, (3) a rule based on X-header combined with (DKIM, SPF, or DMARC) and the email body identifier (e.g. Known ID), X-header combined with (DKIM, SPF, or DMARC), "From" header field and Dmain, (4) a rule based on X-header combined with (DKIM, SPF, or DMARC), and (5) a rule based on the email body identifier (Known ID) combined with (DKIM, SPF, or DMARC).

Returning to FIG. 2, when presenting a prompt to the user 210 after the system analyzes a message, the system may cause the prompt to include specific information about the message that will help the user understand why the system considered a message to be trusted, untrusted, and/or assigned to a particular class, and the system may output that information. For example, if a portion of a message that corresponds to one or more of the factors described above (e.g., a hyperlink, which may be used to assess the age of the hyperlink, whether the address of the hyperlink has a redirect, and/or whether the address of the hyperlink is associated with a trusted registrar or a registrar that is often associated with malicious websites), the system may return the information that it obtained when assessing these factors for the highlighted portion of and display this information (and optionally the corresponding trust values) to the user.

Returning to FIG. 1, in an embodiment, various functions of client computing device 103a . . . 103n can also be implemented in the cybersecurity analyzer 104 or on another remote device or by a remote service on the network. For example, once the client computing device receives a notification indicating that the user has attempted to actuate a file attachment, the client device may transmit the notification along with the message to a remote network device or cybersecurity analyzer for analysis. The remote device may analyze the message or its components and determine whether the message is legitimate, such as by being from a trusted sender based on one or more rules using various embodiments described in this document. If the remote network device determines that the message is from a trusted sender, it may so notify the user with the analysis result. For example, the system may prompt the end user with customized and specific messages confirming that a message is from an untrusted source and ask the user if the user is certain and wants to continue to open the attachment. Or, the system may also take other actions (e.g. prevent or permit opening the attachment).

With further reference to FIG. 1, alternatively and/or additionally, the client computing device may also be configured to receive other messages such as regular emails and malicious emails that are not generated by the cybersecurity server. For example, the client computing device may receive any electronic messages, such as emails, and be configured to determine whether a message is legitimate using various rules described in this document before permitting the user to actuate an attachment to the message.

Figure 5:
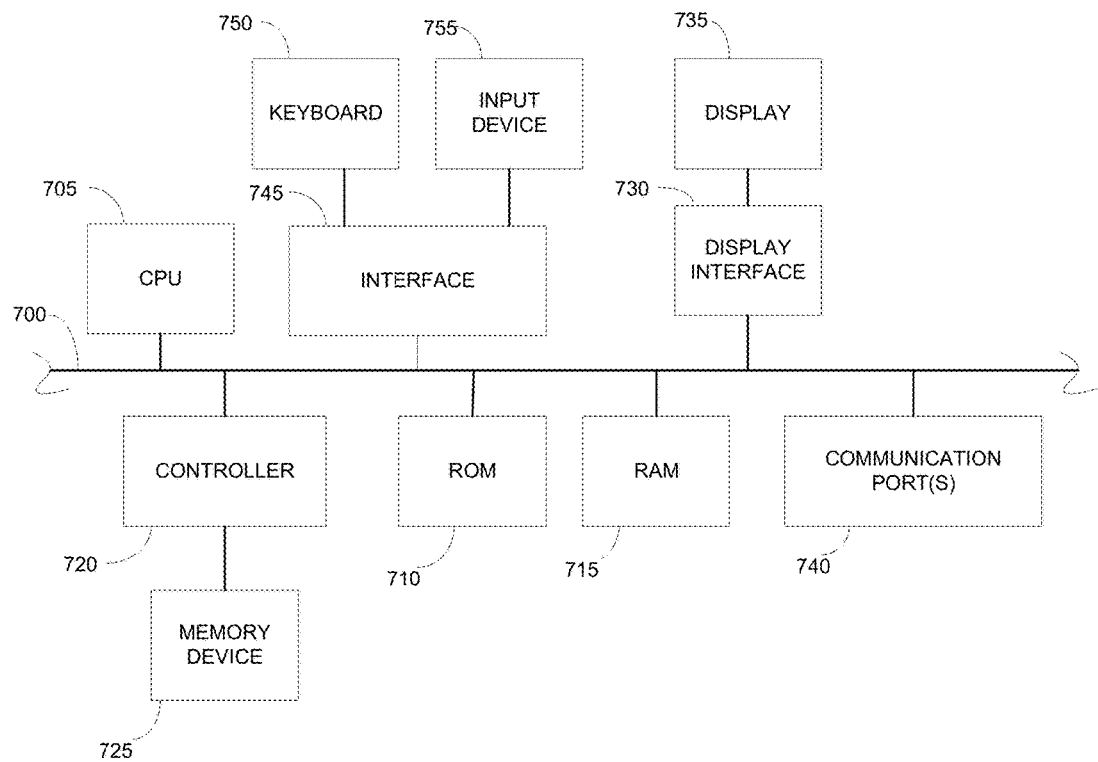
FIG. 5 depicts various embodiments of one or more electronic devices for implementing the various methods and processes described herein.

FIG. 5 depicts an example of internal hardware that may be used to contain or implement the various computer processes and systems as discussed above, such as the client computing devices, the message origination server and/or the cybersecurity analyzer server described above. Thus, any of the user electronic devices, servers, or computing devices discussed above may include some or all of the hardware architecture illustrated in FIG. 1. An electrical bus 700 serves as an information highway interconnecting the other illustrated components of the hardware. CPU 705 is a central processing unit of the system, performing calculations and logic operations required to execute a program. CPU 705, alone or in conjunction with one or more of the other elements disclosed in FIG. 5, is a processing device, computing device or processor as such terms are used within this disclosure. Read only memory (ROM) 710 and random access memory (RAM) 715 constitute examples of memory devices.

A controller 720 interfaces with one or more optional memory devices 725 that service as data storage facilities to the system bus 700. These memory devices 725 may include, for example, an external DVD drive or CD ROM drive, a hard drive, flash memory, a USB drive or another type of device that serves as a data storage facility. As indicated previously, these various drives and controllers are optional devices. Additionally, the memory devices 725 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 710 and/or the RAM 715. Optionally, the program instructions may be stored on a tangible computer readable medium such as a compact disk, a digital disk, flash memory, a memory card, a USB drive, an optical disc storage medium, a distributed computer storage platform such as a cloud-based architecture, and/or other recording medium.

A display interface 730 may permit information from the bus 700 to be displayed on the display 735 in audio, visual, graphic or alphanumeric format. Communication with external devices may occur using various communication ports 740. A communication port 740 may be attached to a communications network, such as the Internet, a local area network or a cellular telephone data network.

The hardware may also include an interface 745 which allows for receipt of data from input devices such as a keyboard 750 or other input device 755 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for managing computer security risks associated with message file attachments in a cybersecurity network, the system comprising:
   a client computing device comprising:
      a processing device,
      a messaging client, and
      a computer-readable medium portion storing programming instructions that are configured to cause the client computing device to:
         receive an electronic message that includes an attachment; and
         prevent the attachment from actuating on the client computing device until the system determines whether the received message is a legitimate message or a potentially malicious message; and
   a computer-readable medium portion storing programming instructions that are configured to cause the client computing device or a remote computing device to:
      determine whether the received message is a legitimate message or a potentially malicious message without analyzing the attachment,
      if the determining determines that the received message is a legitimate message, permit the attachment to actuate on the client computing device, and
      if the determining determines that the received message is not or may not be a legitimate message, continue preventing the attachment from actuating on the client computing device.

2. The system of claim 1, further comprising:
   a message origination server configured to generate and transmit mock malicious messages with mock malicious attachments; and
   additional programming instructions that are configured to cause the client computing device to, for any message that the system determines is a legitimate message and that is one of the mock malicious messages and for which the system receives an indication that a user of the client computing device attempted to open the attachment:
      analyze a header section of that message to detect an identifier that can be used to identify a user or device to which that message was directed, wherein the identifier comprises a value of a "TO" field in the header section, a device code, or a user identifier, and
      send the detected identifier and related event information to a cybersecurity analyzer server for recording in a data store information indicating that the user attempted to open an attachment to a mock malicious message.

3. The system of claim 1, further comprising additional programming instructions that are configured to cause the client computing device or remote computing device to:
   cause the client computing device to output a prompt to the user, wherein the prompt includes a result of the determination of whether the received message is a legitimate message or a potentially malicious message;
   further analyze the received message to assign a class to the received message; and
   include information corresponding to the assigned class in the prompt.

4. The system of claim 1, wherein:
the programming instructions for determining whether the received message is a legitimate message or a malicious message comprise instructions to:
select a structural element of the received message,
obtain information corresponding to the structural element, and
use the obtained information to assign a trust value to the structural element; and
the system comprises additional programming instructions that are configured to cause the client computing device to output a prompt that presents a user with the structural element, and descriptive material corresponding to the obtained information, to train the user about how the structural element can help identify why the received message is a legitimate message.

5. The system of claim 4, wherein the programming instructions for obtaining information corresponding to the structural element comprise instructions to, if the structural element comprises a hyperlink, access a domain name registrar to retrieve information that indicates an age of a domain associated with the hyperlink.

6. The system of claim 4, wherein the programming instructions for obtaining information corresponding to the structural element comprise instructions to, if the structural element comprises a hyperlink, obtain the information corresponding to the structural element by:
identifying a domain name registrar for a domain associated with the hyperlink, and
accessing a data set of known domain name registrars to identify whether the registrar is known to register malicious websites.

7. The system of claim 4, wherein the programming instructions for obtaining information corresponding to the structural element comprise instructions to, if the structural element comprises a plurality of hyperlinks, determine a number of redirects associated with the plurality of hyperlinks.

8. The system of claim 3, further comprising:
a message origination server configured to generate and transmit mock malicious messages with mock malicious attachments; and
wherein the instructions for assigning a class to the received message comprise instructions to, if the received message is one of the mock malicious messages generated by the message origination server, assign a mock malicious message class to the received message.

9. The system of claim 8, wherein the instructions for assigning a class to the received message comprise instructions to determine that received message is one of the mock malicious messages if:
a header field of a header section of the received message starts with a predetermined key; and
for any header field that starts with the predetermined key, that header field also includes a value that satisfies a first trusted sender rule.

10. The system of claim 9, wherein the instructions to determine that a received message is one of the mock malicious messages also require that an additional element of the received message satisfies a second trusted sender rule as a condition of determining that a received message is one of the mock malicious messages, wherein the second trusted sender rule comprises:
a requirement that any header field having a FROM fieldname include a value that is associated with a known sender;
a requirement that any header field that includes a domain have a value that is associated with a known domain; or
a requirement that any header field having a FROM fieldname include a value that is associated with a known sender, and a requirement that any header field that includes a domain include a value that is associated with a known domain.

11. The system of claim 1, wherein the programming instructions that cause the client computing device to prevent the attachment from actuating on the client computing device until the system determines whether the received message is a legitimate message or a potentially malicious message comprise instructions to:
quarantine the received message; and
release the received message from quarantine only if and after determining that the received message is a legitimate message.

12. A method of managing computer security risks associated with message file attachments in a cybersecurity network, the method comprising:
by a client computing device comprising a processing device, executing programming instructions configured to cause the client computing device to:
receive, by a messaging client application of the client computing device, an electronic message that includes an attachment,
prevent the attachment from actuating until the client computing device determines whether the received message is a legitimate message or a potentially malicious message,
without analyzing the attachment, determine whether the received message is a legitimate message or a potentially malicious message,
if the determining determines that the received message is a legitimate message, permit the attachment to actuate on the client computing device, and
if the determining determines that the received message is not or may not be a legitimate message, continue to prevent the attachment from actuating on the client computing device.

13. The method of claim 12, further comprising:
by a message origination server, generating and transmitting mock malicious messages with mock malicious attachments; and
by the client computing device, for any message that the client computing device determines is a legitimate message and that is one of the mock malicious messages and for which the system receives an indication that a user of the client computing device attempted to open the attachment:
analyzing a header section of that message to detect an identifier that can be used to identify a user or device to which that message was directed, wherein the identifier comprises a value of a "TO" field in the header section, a device code, or a user identifier, and
sending the detected identifier and related event information to a cybersecurity analyzer server for recording in a data store information indicating that the user attempted to open an attachment to a mock malicious message.

14. The method of claim 12, further comprising by the client computing device:
outputting a prompt to the user, wherein the prompt includes a result of the determination of whether the received message is a legitimate message or a potentially malicious message;

further analyzing the received message to assign a class to the received message; and including information corresponding to the assigned class in the prompt.

15. The method of claim 12, wherein:

determining whether the received message is a legitimate message or a malicious message comprises:

selecting a structural element of the received message;

obtaining information corresponding to the structural element, and using the obtained information to assign a trust value to the structural element; and the method also comprises outputting a prompt that presents the user with the structural element, and descriptive material corresponding to the obtained information, to train the user about how the structural element can help indicate why the received message is a legitimate message.

16. The method of claim 15, wherein obtaining the information corresponding to the structural element comprises, if the structural element comprises a hyperlink, accessing a domain name registrar to retrieve information that indicates an age of a domain associated with the hyperlink.

17. The method of claim 15, wherein obtaining the information corresponding to the structural element comprises, if the structural element comprises a hyperlink, obtaining the information corresponding to the structural element by:

identifying a domain name registrar for a domain associated with the hyperlink; and accessing a data set of known domain name registrars to identify whether the registrar is known to register malicious websites.

18. The method of claim 15, wherein obtaining the information corresponding to the structural element comprises, if the structural element comprises a plurality of hyperlinks, determining a number of redirects associated with the plurality of hyperlinks.

19. The method of claim 14, further comprising:

by a message origination server, generating and transmitting mock malicious messages with mock malicious attachments; and when assigning a class to the received message, if the received message is one of the mock malicious messages generated by the message origination server, assigning a mock malicious message class to the received message.

20. The method of claim 19, further comprising determining that the received message is one of the mock malicious messages if:

a header field of a header section of the received message starts with a predetermined key; and for any header field that starts with the predetermined key, that header field also includes a value that satisfies a first trusted sender rule.

21. The method of claim 20, further comprising requiring, as a condition of determining that a received message is one of the mock malicious messages, that an additional element of the received message satisfies a second trusted sender rule, wherein the second trusted sender rule comprises:

a requirement that any header field having a FROM fieldname include a value that is associated with a known sender;

a requirement that any header field that includes a domain have a value that is associated with a known domain; or a requirement that any header field having a FROM fieldname include a value that is associated with a known sender, and a requirement that any header field that includes a domain have include a value that is associated with a known domain.

22. The method of claim 12, wherein preventing the attachment from actuating until the client computing device determines whether the received message is a legitimate message or a potentially malicious message comprises:

quarantining the received message; and releasing the received message from quarantine only if and after the client computing device determines that the received message is a legitimate message.

\* \* \* \* \*